US006839146B1

(12) United States Patent
Ishida et al.

(10) Patent No.: US 6,839,146 B1
(45) Date of Patent: Jan. 4, 2005

(54) IMAGE PROCESSING METHOD, APPARATUS, AND MEDIUM STORING PROGRAM FOR CHECKING FOR COPY-PROHIBITED OBJECTS

(75) Inventors: Yoshihiro Ishida, Yokohama (JP); Keiichi Iwamura, Yokohama (JP); Takeshi Makita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/535,975

(22) Filed: Mar. 27, 2000

(30) Foreign Application Priority Data

Mar. 31, 1999 (JP) .......................................... 11-093001

(51) Int. Cl.[7] .............................. G06F 3/12; G06F 13/00
(52) U.S. Cl. ...................... 358/1.14; 358/1.9; 358/2.1
(58) Field of Search ............................. 358/1.14, 1.15, 358/1.6, 1.5, 1.2, 1.12, 1.13, 1.18, 501, 504, 526, 530, 401, 426.06, 453; 382/135, 277, 144, 191–195

(56) References Cited

U.S. PATENT DOCUMENTS 5,321,470 A  6/1994 Hasuo et al. ............... 355/201
5,621,810 A * 4/1997 Suzuki et al. .............. 382/135

* cited by examiner

*Primary Examiner*—Gabriel Garcia
*Assistant Examiner*—Douglas Tran
(74) *Attorney, Agent, or Firm*—Fitzpatrick, Cella, Harper & Scinto (57) ABSTRACT

A configuration is provided in which whether or not an article to be copied by a scanner is a copy-prohibited article such as a bill can be judged in a relatively short period of time. First, a copy object is prescanned by a scanner and read in rough pixel density, and with respect to the image, whether or not a copy object is a copy-prohibited article is checked. After completion of checking, main scanning is carried out to obtain a desired image of high density. As the result of the checking, the possibility that a copy object is a copy-prohibited article is examined, and when the possibility is low, said image of high density is output, and when the possibility is high, the image is checked again. As the result of checking, the possibility that a copy object is a copy-prohibited article is examined, and when the possibility is high, processing that the image is totally coated is carried out to output an unnormal image, and when the possibility is low, a normal image is output.

23 Claims, 7 Drawing Sheets

IMAGE PROCESSING METHOD, APPARATUS, AND MEDIUM STORING PROGRAM FOR CHECKING FOR COPY-PROHIBITED OBJECTS

BACKGROUND OF THE INVENTION

1. Field of the Invention

The present invention relates to an image forming apparatus, an image forming method, and a storage medium.

2. Related Background Art

It has been heretofore proposed to provide an image recognizing and processing function for preventing forgery of bills, securities or the like for a color copying machine. This intends that in a case where an image of image data having a read copy object is judged to be an anti-forgery object image, a normal copy output is prevented in a manner that (1) such image data is totally coated with some color to effect print output, (2) some symbol or graphic figure is superposed thereon to effect print out, (3) color or image size is changed to effect output, or (4) no print output is effected.

Incidentally, the copying machine, in principle, copies faithfully an object placed on an original table except copy-prohibited objects such as a bill. Therefore, in a case where an image analogous to a bill (not a bill but an image capable of being copied legally) is input, it is necessary to recognize it as not being a bill and to carry out copy processing. Therefore, extremely strict precision is demanded for judgment if a recognition object image falls under an anti-forgery object image.

On the other hand, recently, the quality of an image obtained by a color scanner or a color printer which is inexpensive as compared with a color copying machine has been rapidly enhanced. Even if these machineries are connected to a personal computer for a so-called use of a combination of apparatuses comprising elements of a color copying machine, a forgery action similar to that as described above is possible. Because of this, even in an image processing system using an expensive color scanner or a color printer, anti-forgery measures for bills or securities by the provision of the an image recognition processing function have been desired.

However, it is desirable for an inexpensive color scanner and a color printer to realize the image recognizing and processing function even more inexpensively as compared with a relatively expensive color copying machine. To this end, it is a strong solving measure rather to employ a realizing method mainly composed of software not depending on a realizing method mainly composed of hardware multi-using electronic circuits or the like. On the other hand, however, when the realizing method mainly composed of software is employed for judgment of the anti-forgery object image for which strict judging precision is demanded as previously mentioned, there is a problem that it takes materially long processing time for the recognition and judgment, as compared with the realizing method mainly composed of hardware.

For an operator for handling images which are not anti-forgery objects, short processing time is generally preferred from a viewpoint of work efficiency. It is not preferable, in order to cope with an operator who intends to form an image of a mere handful of bills and securities, to increase processing time for other fair operators.

SUMMARY OF THE INVENTION

It is an object of the present invention to provide an image processing apparatus, an image processing method, and a storage medium which solve the aforementioned problems.

It is a further object of the present invention to provide a configuration wherein in a case where an image which is not an anti-forgery object is handled, processing time is made as quick as possible, and for anti-forgery of bills or securities, effective image recognizing and processing functions are provided.

For achieving the aforementioned objects, according to a preferred embodiment of an image processing method of the present invention, the method comprises the steps of: inputting image data, and checking plural copy-prohibited objects whether or not an image of image data input in said inputting step is a copy-prohibited object, order for checking being determined, the respective steps except the final step out of said steps of checking plural copy-prohibited objects judging whether or not checking in the next step of checking copy-prohibited object is carried out.

It is another object of the present invention to provide a new function.

Other objects and features of the present invention will become apparent from the ensuing embodiments and drawings.

DESCRIPTION OF THE PREFERRED EMBODIMENTS

Embodiments of the present invention will be described hereinafter with reference to the drawings.

(First Embodiment)

Figure 2:
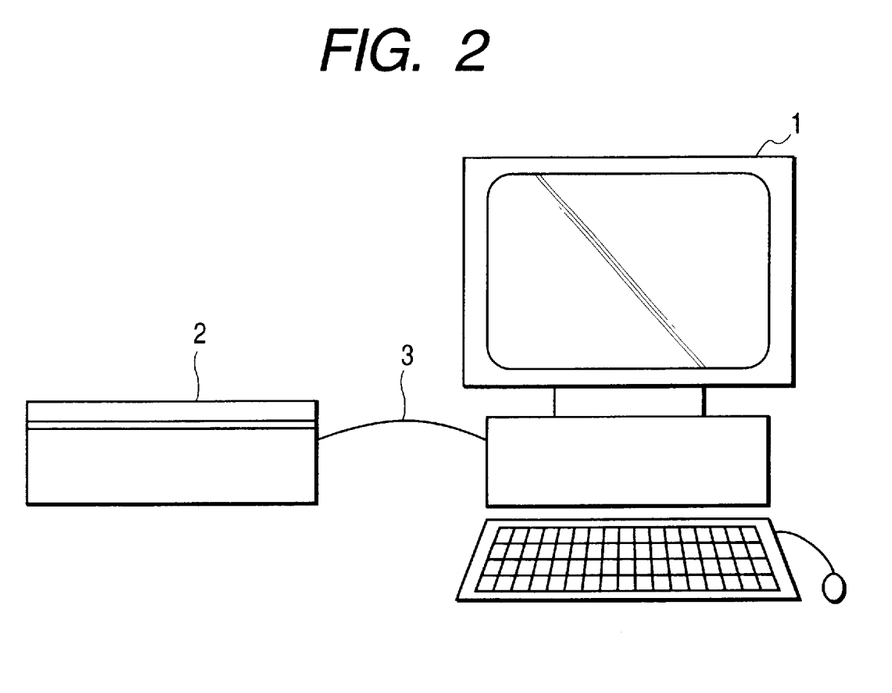
FIG. 2 is a block diagram showing the constitution of an image processing system according to the first to third embodiments.

FIG. 2 shows an image processing system according to an embodiment of the present invention.

In FIG. 2, reference numeral 1 designates a personal computer as a computer system; 2 a color image scanner as an image inputting device; and 3 a connecting cable for exchanging data between the computer system of the personal computer 1 and the color image scanner 2. Obviously, the connecting cable may be wireless. Further, the image inputting device is not limited to an original scanner but other scanners such as a film scanner may be employed.

Figure 3:
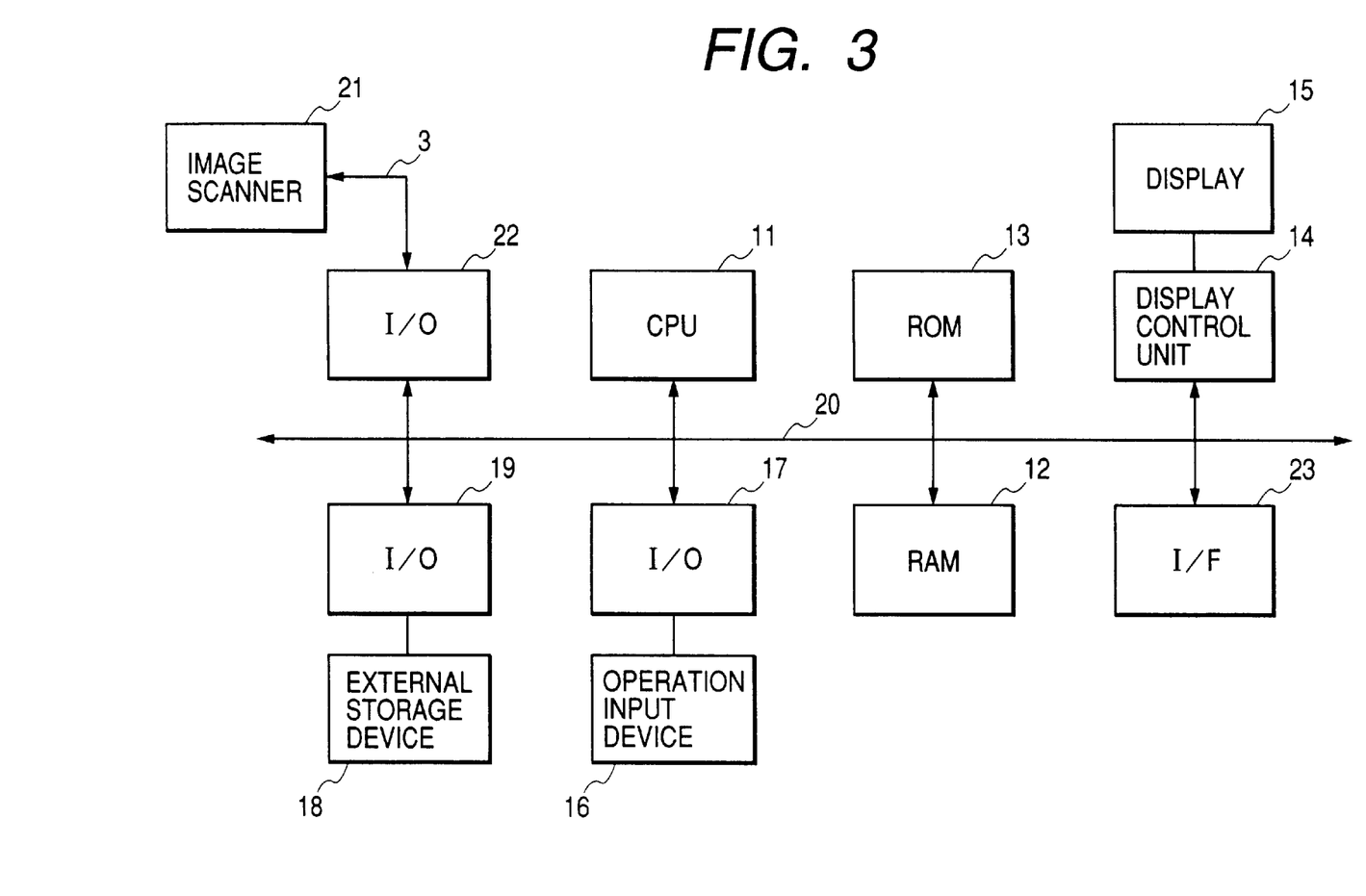
FIG. 3 is a block diagram showing the constitution of main parts of an image processing system according to the first to third embodiments.

FIG. 3 is a block diagram in which the main parts in the constitution shown in FIG. 2 are expressed as function modules.

In FIG. 3, reference numeral 11 designates a CPU; 12 a RAM; 13 a ROM; 14 a display control unit; 15 a display; 16 an operation input device such as a keyboard, a mouse, etc.; 17 a connection I/O (input/output) unit of the operation input device 16; 18 an external storage device such as a hard disk device; 19 a connection I/O unit of the external storage device; 20 a bus; 21 a color image scanner as an image input instrument; 22 a connection I/O unit with the color image scanner 21; and 23 an I/F (interface) unit with a communication means such as a network.

Figure 1:
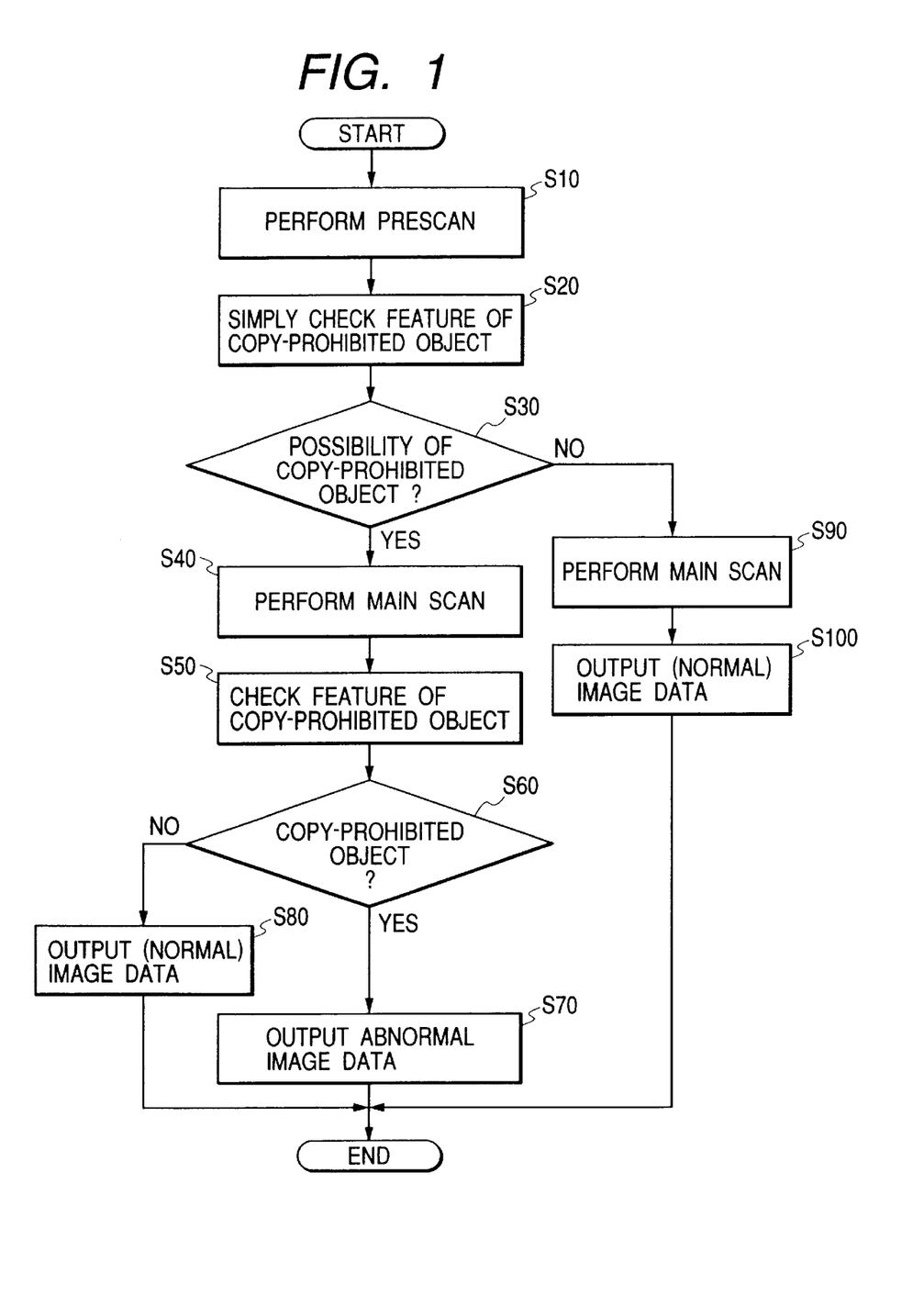
FIG. 1 is a flow chart showing the operating procedure according to the first embodiment of the present invention.

FIG. 1 is a flow chart showing the operation procedure of the present embodiment according to the constitutions of FIGS. 2 and 3. A program capable of being executed by a computer describing the procedure shown in the flow chart in FIG. 1 is stored in advance in ROM 13, or a program stored in advance in the external storage device 19 is read on RAM 12, after which the program is executed by CPU 11 (software processing), thereby realizing the ensuing embodiments.

In FIG. 1, when a series of processes starts, in the prescan in Step S110, CPU 11 instructs the color image scanner 21 to read an original placed on an original table indicated by an operator through the operation input device 16 with a read density (e.g., 100 dpi (dot/inch)) which is rough as compared with a read density (e.g., 400 dpi) desired finally. The color image scanner 21 performs reading of an original with a rough density as instructed. The read image data with a rough density is captured on RAM 12 through the I/O unit 22. The reading with a rough density as described is realized using a well known function provided by a color image scanner driver.

Then, in Step S20, a simple check of feature of copy-prohibited object is performed. Here, image data read with a rough density on RAM 12 read in Step S10 is collated with feature of copy-prohibited image with a rough density stored in advance in ROM 13 (e.g., imaginary feature peculiar to copy-prohibited image such as a bill, a security, etc.) by image recognizing and processing. The procedure proceeds to Step S30.

In Step S30, judgment is made from the result of collation in Step S20 whether or not the possibility of copy-prohibited object is high. If the possibility is high, the procedure proceeds to Step S40, and if not, the procedure proceeds to Step S90.

In Step S40, CPU 11 instructs the color image scanner 21 through the I/O unit 22 to perform main scan which reads an original placed on an original table with a read density (e.g., 400 dpi) desired finally. The color image scanner 21 performs reading of an original with the read density instructed. The thus read image data is captured on RAM 12 through the I/O unit 22. Upon termination of Step S40, the procedure proceeds to Step S50.

In Step S50, collation is made by the image recognizing and processing if the image data read in Step S40 has feature of copy-prohibited image in a pixel density desired finally stored in advance on ROM 13. The procedure proceeds to Step S60.

In Step S60, judgment is made from the result of collation in Step S50 whether or not the image is copy-prohibited object image. If judgment is made to be copy-prohibited object image, the procedure proceeds to Step S70, and if not, the procedure proceeds to Step S80.

In Step S70, image data which is not normal image data is output.

That is, as previously mentioned, any of (1) image data totally coated with some color is output, (2) image data having some symbol or graphic figure superposed is output, and (3) image data having color or image size changed is output, or an unnormal (not image data itself read) image obtained from a combination of the above data is output.

Preparation of these unnormal images can be achieved easily by executing, in CPU 11, a program module for applying adequate known image processing having a read image on RAM 12 input. The thus prepared unnormal image data is output as an image data file to the external storage device 18 via the I/O unit 19. When Step S70 is finished, a series of processes is finished.

Step S80 corresponds to a case where in the simple judgment in Step S30, the possibility of copy object is judged but in the judgment in the pixel density desired finally in Step S60, the absence of copy-prohibited object image is judged. The image data read in Step S40 is output as an image data file to the external storage device 18 via the I/O unit 19. When Step S80 is finished, a series of processes is finished.

In Step S90, CPU 11 instructs the color image scanner 21 through the I/O unit 22 to perform the main scan for reading an original placed on the original table with the read density (e.g., 400 dpi) desired finally. The color image scanner 21 reads an original with the read density instructed. The thus read image data is captured on RAM 12 through the I/O unit 22. When Step S90 is finished, the procedure proceeds to Step S100.

Step S100 corresponds to a case where in the simple judgment in Step S30, judgment is made that there is no possibility of copy object. The image data read in Step S90 is output as an image data file to the external storage device 18 via the I/O unit 19 without applying the process that whether or not feature of copy-prohibited image in the pixel density desired finally is present is collated by the image recognizing process such as Step S50 where judgment is made that there is possibility of copy object in the simple judgment in Step 30. When Step S100 is finished, a series of processes is finished.

In Step S70 mentioned previously, it can be configured of course that some image data file is not always output but (4) no output of image data is effected.

Alternatively, in the image recognizing processing performed in Step S50, the evaluation value may be calculated by comparing the color spectral distribution of image data obtained by scanning an original with data registered in advance in ROM 13 on the basis of pixel values (a set of values of R, G, and B corresponding to three color signals) in the image data (a difference is obtained as the sum of absolute values of a differential value between numerical values, or a mutual relative value between distributions, is calculated, etc.), or by comparing a synthetic image pattern of a part of or the whole original with pattern data registered in advance in ROM or the like. For example, such the image recognizing processing in Step S50 is described in U.S. Pat. No. 5,321,470.

In Step S60, the evaluation value (such as the sum of absolute values of a differential value, or the mutual relative value between distributions) obtained in Step S50 is judged on the basis of threshold. For example, if the sum of absolute values of a differential value does not exceed the threshold, it is regarded as copy-prohibited object, and if it exceeds the threshold, judgment is made that it is not copy-prohibited object. Alternatively, if the sum of absolute values of a differential value exceeds the threshold, it is regarded as copy-prohibited object, and if not, judgment is made that it is not copy-prohibited object.

Further, in the simple image recognizing processing performed in Step S20, for example, the image recognizing processing performed in Step S50 can be realized by performing the exactly similar processing on the image data with rough pixel density. However, since the image size as an object when the image recognizing processing is carried out is materially smaller than that in Step S50, number of pixels to be processed can be materially reduced. Because of this, the precision of judgment lowers, but high-speed image recognizing processing can be carried out.

As described above, according to the present embodiment, the checking method for plural copy-prohibited objects different in operation amount is prepared, so that the possibility of copy-prohibited object is roughly judged in small operation amount, and only when judgment is made that the possibility of copy-prohibited object is high, copy-prohibited objects in relative large operation amount are strictly checked, whereby for input images which are not copy-prohibited objects, judgment whether or not there is a copy-prohibited object is can be finished in a short period of time.

With this, for an image which is apparently not a copy-prohibited object, checking whether or not there is a copy-prohibited object can be done in less time, and for an input image which is high in possibility of copy-prohibited image, more restrictive checking can be done, thus enabling realization of image recognizing processing function effective for anti-forgery more efficiently by the software body.

(Second Embodiment)

While in the above-described first embodiment, with respect to the simple check of copy-prohibited object shown in Step S20, an example has been explained in which similarly to the check of copy-prohibited object in the pixel density desired finally shown in Step S50, whether or not there is similar feature on the image data with rough pixel density is collated with the image recognizing processing, means is not limited thereto.

That is, according to a second embodiment of the present invention, in simple check of copy-prohibited object, judgment is made such that whether or not the sum S of pixels, in which pixel values (R, G and B) of image data with rough pixel density fulfill $R_L<R<R_H$, and $G_L<G<G_H$, and $B_L<B<B_H$ relative to predetermined values $R_L$ and $R_H$, $G_L$ and $G_H$, $B_L$ and $B_H$, respectively, (or a rate occupied in the sum of pixels included in image data with rough pixel density), fulfills $S_L<S<S_H$ relative to predetermined values $S_L$ and $S_H$.

Assuming that values of color components R, G and B of pixel values have a dynamic range of 8 bits, that is, $\leq R \leq 255$, $0<G_L<G_H<255$, $0<R_L<R_H<255$, $0 \ G_L<G_H<255$, and $0<B_LB_H<255$ result.

By doing so, it is possible to materially reduce the capacity of registration data that should be registered in advance in ROM, as compared with the method for registering data of color spectral distribution of an original and a synthetic image pattern of the whole original. Further, since processing time is less than that of comparison using spectral distribution which takes processing time (calculation of interrelation of distribution) and pattern matching, high speed judgment becomes enabled.

(Third Embodiment)

While in the above-described second embodiment, a description has been made wherein in simple check of copy-prohibited object, judgment is made such that whether or not the sum S of pixels, in which pixel values (R, G and B) of image data with rough pixel density fulfill $R_L<R<R_HI$, and $G_L<G<G_H$, and $B_L<B<B_H$ relative to predetermined values $R_L$ and $R_H$, $G_L$ and $G_H$, $B_L$ and $B_H$, respectively, (or a rate occupied in the sum of pixels included in image data with rough pixel density), fulfills $S_L<S<S_HI$ relative to predetermined values $S_L$ and $S_H$, means is not limited thereto.

That is, in the third embodiment according to the present invention, judgment is made such that whether or not the sum S of pixels, in which pixel values (R, G and B) of image data with read density desired finally fulfill $R_L<R<R_H$, and $G_L<G<G_H$, and $B_L<B<B_H$ relative to predetermined values $R_L$ and $R_H$, $G_L$ and $G_H$, $B_L$ and $B_H$, respectively, (or a rate occupied in the sum of pixels included in image data with rough pixel density), fulfills $S_L<S<S_H$ relative to predetermined values $S_L$ and $S_H$.

By doing so, the prescan portion shown in Step S10 in a flow chart of FIG. 1 will be the action of the main scan explained in Step S90, and the main scan in Step S40 and Step S90 is unnecessary.

Figure 4:
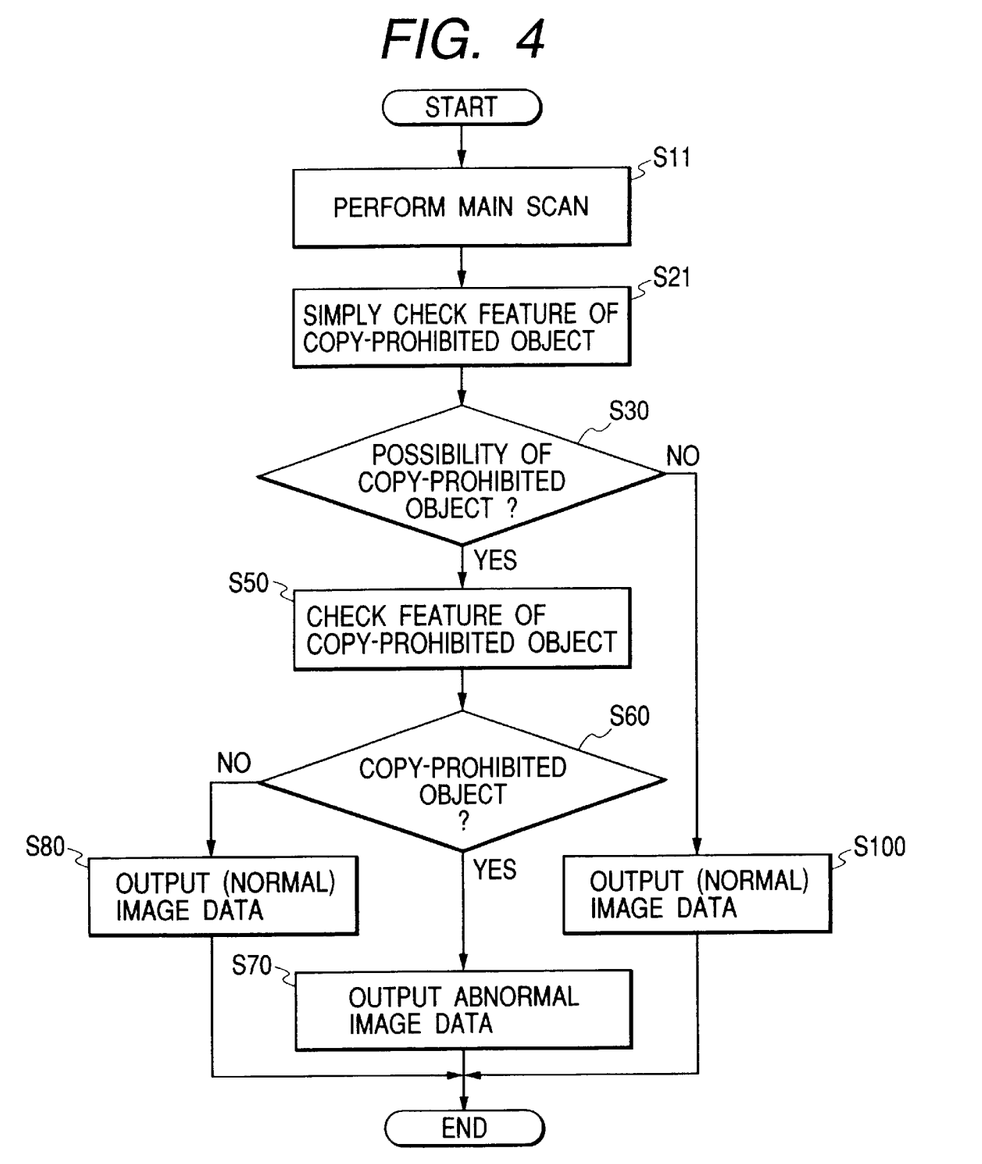
FIG. 4 is a flow chart showing the operating procedure according to the third embodiment of the present invention.

A flow chart for that case is shown in FIG. 4.

In FIG. 4, Step S11 and Step S21 correspond to Step S10 and Step S20, respectively, and other parts perform the action similar to that of the same Step numbers in a flow chart of FIG. 1. In this case, processing time required for the simply check feature of copy-prohibited object in Step 20 is long, but there is a merit that the prescan need not be performed.

Even in this case, judgment whether or not there is a simply copy-prohibited object can be performed with considerably less operation amount as compared with the operation amount of the simply check feature of copy-prohibited object (mutual comparison of color spectral distribution, calculation of interrelation, pattern matching) in Step S50. Therefore, processing time required for a series of processes from start to end can be reduced.

(Fourth Embodiment)

While in the first to third embodiments, a description has been made in connection with the image read by the color scanner that only in a case where before the check of copy-prohibited object is directly applied to the image data with read density desired finally, relatively simple check of copy-prohibited object is carried out with less operation amount than the former, and judgment is made that there is the possibility of copy-prohibited object image, the check feature of copy-prohibited object of higher precision is applied, means is not limited thereto.

That is, in the fourth embodiment of the present invention, a check object is not always limited to a color image read by a color scanner, but for example, is obtained through the I/F unit 23 with a communication means of a network or the like in FIG. 3, or is obtained by mounting a detachable storage medium (e.g., such as a smart medium, a compact flash, an optical magnetic disk or the like) on a drive device for storage medium connected to the image processing system not shown to thereby capture a color image data held on the detachable storage medium.

Figure 5:
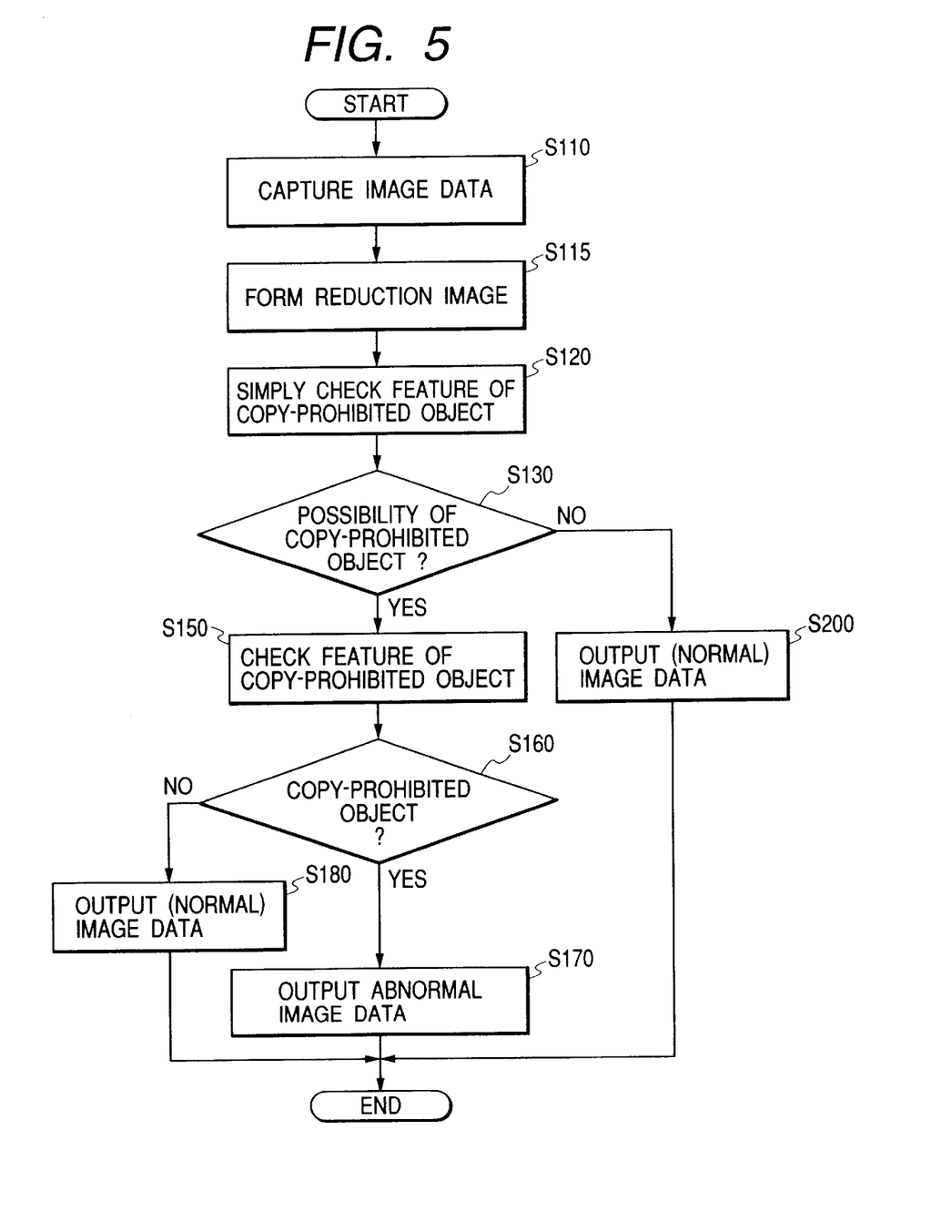
FIG. 5 is a flow chart showing the operating procedure according to the fourth embodiment of the present invention.

The processing procedure in this case is shown in a flow chart of FIG. 5.

In FIG. 5, when a series of processes starts, in Step S110, image data held on the detachable storage medium mounted on a drive device is read on RAM 12 through the I/O unit with the drive device of the detachable storage medium not shown. Subsequently, in Step S115, image data corresponding to image data with rough pixel density described in the above-described first to second embodiments is formed on RAM 12 by a well known reduction method (e.g., simply regularly thinning out pixels).

Thereafter, Steps S120, S130, S150, S160, S170, S180 and S200 perform the operation similar to Steps S20, S30, S50, S60, S70, S80 and S100. It should be noted that if image data is read in RAM 12 from a storage medium with images having plural resolutions stored to the same image, processing of Step S1120 can be carried out using a low resolution out of plural resolutions.

With respect to the capture of image data in Step S1110, it is of course possible that the capture through the I/F unit 23 with communication means of a network such as an internet can be employed.

(Fifth Embodiment)

While in the above-described embodiments 1 to 4, a description has been made such that even in case of outputting image data as normal image data, or even in case of outputting image data as unnormal image data, image data is output as an image data file to the external storage device 18 (such as a hard disk within the image processing system) via the I/O unit 19, means is not limited thereto.

That is, in the fifth embodiment of the present invention, there is employed the form of output wherein image data is output to a color printer connected to an image processing system, or is output to the outside of the image processing system through the I/F unit 23 with a communication means such as a network.

Figure 6:
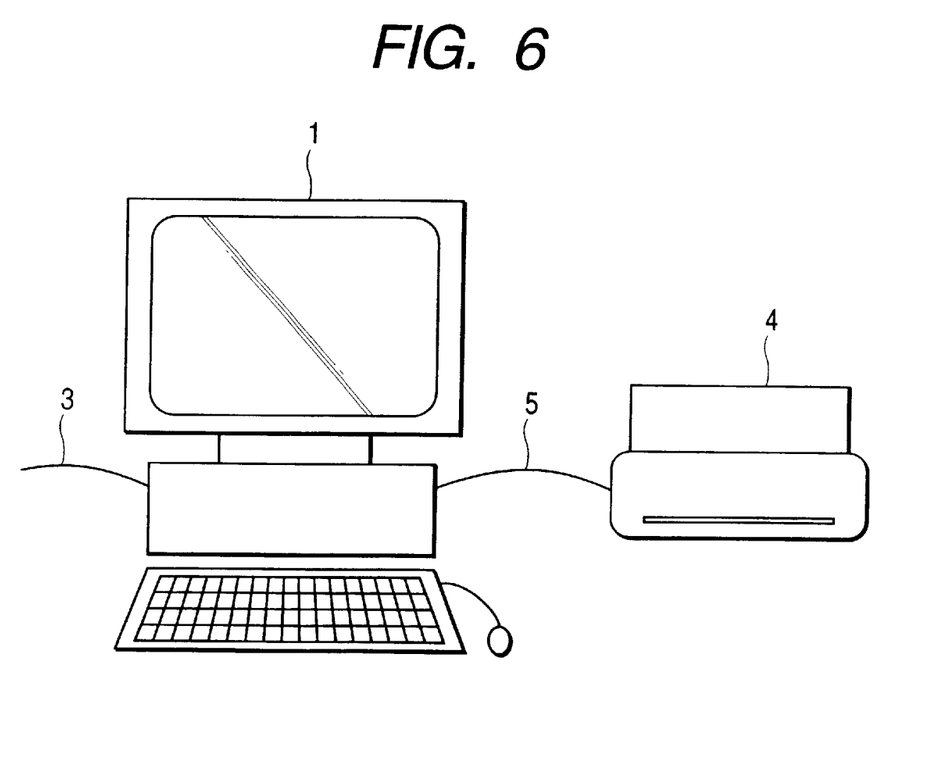
FIG. 6 is a block diagram showing the constitution of an image processing system according to the fifth embodiment.

An example of the image processing system according to the present embodiment in this case is shown in FIG. 6.

In FIG. 6, reference numeral 1 designates a personal computer as a computer system; 4 a color printer as an image output device; and 5 a connecting cable for transmitting/receiving data between the personal computer 1 and the color printer 4. It is apparent that the connecting cable may be wireless. The printer may be such printers as an ink jet printer, a laser printer, and a thermal transfer printer.

Figure 7:
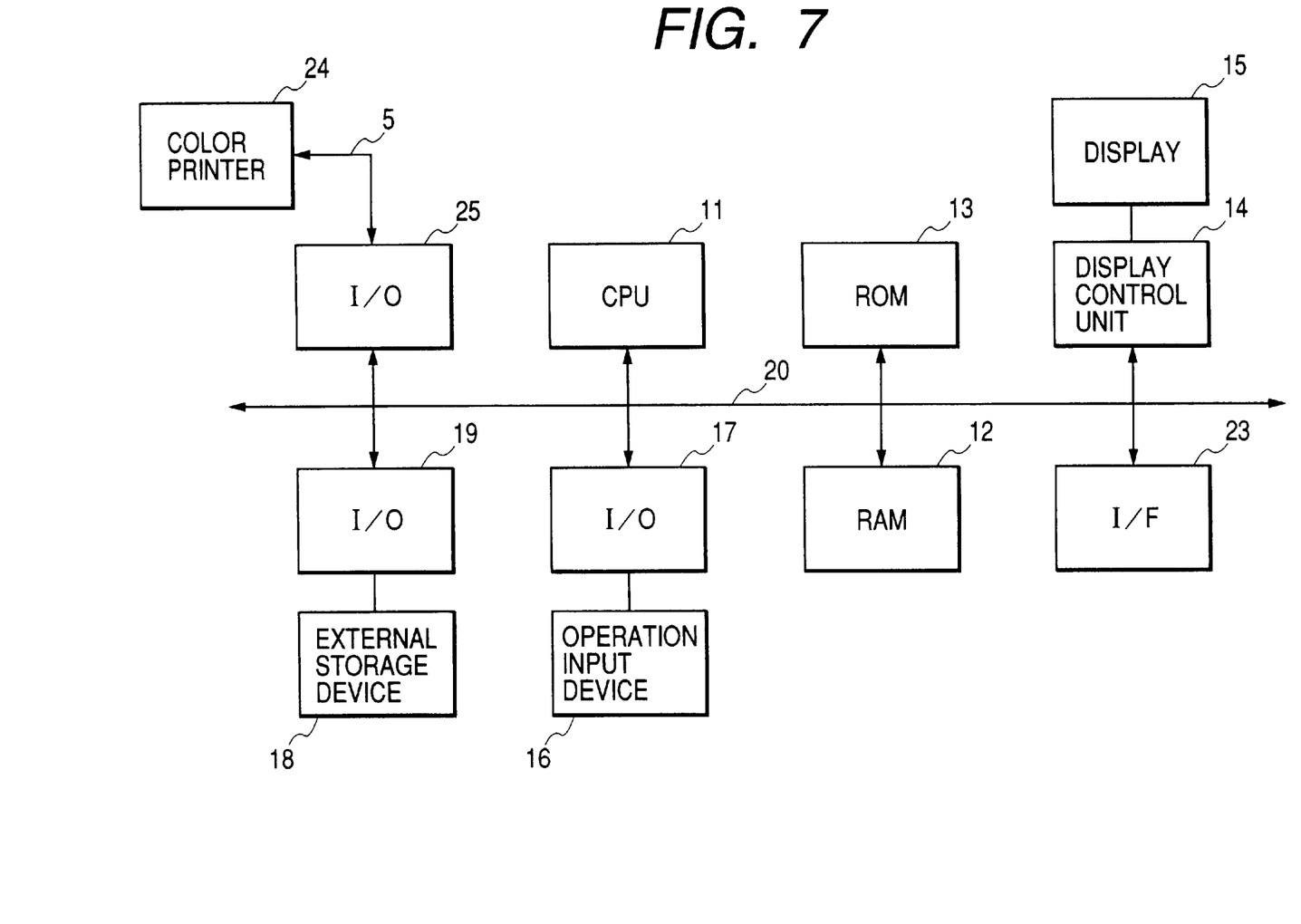
FIG. 7 is a block diagram showing the constitution of main parts of an image processing system according to the fifth embodiment.

FIG. 7 is a block diagram expressing main parts of the constitution shown in FIG. 6 by a block of function module.

In FIG. 7, reference numeral 24 designates a color printer as an image output device; and 25 a connecting I/O unit with the color printer 24.

Other parts are constituted exactly similar to FIG. 3.

In the case of the present embodiment, in Steps S70, S80, S100, S170, S180 and S200 in the flow charts of FIGS. 1, 4 and 5 in the above-described first to fifth embodiments, an image data output is output to the color printer 24 which is connected to an image processing system via the I/O unit 25.

It is to be noted of course that the output form of image data in Steps S70, S80, S100, S170, S180 and S200 may comprise a configuration in which image data is output to the outside of the system through the I/F unit 23 with communication means such as a network of an internet.

(Sixth Embodiment)

While in the above-described first to fifth embodiments, a description has been made that after the color data has been once read on RAM 12, simple check of copy-prohibited object and check of copy-prohibited object are carried out, means is not limited thereto.

That is, in the sixth embodiment of the present invention, partial check in connection with data which have been read sequentially is carried out during reading of color image data. Analysis and totaling of color spectral distributions of images during reading for comparison with color spectral registered in advance, and counting of pixels having a certain determined pixel value can be sequentially processed during reading.

(Seventh Embodiment)

In the above-described first to sixth embodiments, there has been made the description that in a case where it is judged that in the simple check of copy-prohibited object, the possibility of copy-prohibited object is high, the next check of copy-prohibited object is carried out. However, in the seventh embodiment of the present invention, characters, mars or graphical animations such as "Check of copy-prohibited object being done." or "There is doubt of copy-prohibited object!" are displayed on the screen of a display unit during the check of copy-prohibited object.

This display may be effected during time required for processing of Step S50 in FIG. 1 or FIG. 4, or Step S150 in FIG. 5. It is noted that since the simple check of copy-prohibited object takes not much time, and there is no merit to inform a large majority of operators that the check of copy-prohibited image is carried out (there is the possibility of the presence of a person who prints a copy-prohibited image half for fun), display is not particularly effected at the time of simple check of copy-prohibited object. If in the simple check of copy-prohibited object, check algorithm which takes much time is employed, the aforementioned display may be effected.

By doing so, an operator is notified by the system to the effect that it takes processing time for the check of copy object, thus enabling expectation of dissolution of irritation in waiting time, and effect of alarming the copy-prohibition of copy-prohibited articles.

(Eighth Embodiment)

While in the above-described first to seventh embodiments, a description has been made that two checks of copy-prohibited object, i.e., simple check of copy-prohibited object and check of copy-prohibited object are carried out, means is not limited thereto.

That is, in the eighth embodiment of the present invention, it is designed so that three checks of copy-prohibited object are carried out.

Alternatively, in the first check of copy-prohibited object, very rough check of copy-prohibited object is carried out. Only a case where judgment is made in check that copy-prohibited object has a doubt, the second check of copy-prohibited object is carried out, and only a case where judgment is made in the second check that copy-prohibited object has a doubt, the third check of copy-prohibited object is carried out.

For example, it is designed so that in the first check of copy-prohibited object, image data having 25 dpi of pixel density is used as object; in the second check of copy-prohibited object, image data having 100 dpi of pixel density is used; and in the third check of copy-prohibited object, image data having 400 dpi of pixel density is used. Image features of copy-prohibited images in respective pixel densities are registered in advance in ROM 13, and object checks with respective image densities corresponding thereto are carried out. In a case where it is judged that the image data is not the copy-prohibited article in the first or second check of copy-prohibited object, the subsequent checks of copy-prohibited object (in an image of a higher pixel density) are not carried out any more.

In a case where the system in each of the embodiments shown in FIGS. 2, 3, 6 and 7 is constituted in the form of a computer system comprising CPU 11 and a memory such as ROM 13 or the external storage device 18, programs for executing processing in the flow charts shown in FIGS. 1, 4 and 5 are stored in the aforesaid memory. This storage medium can be regarded as one form of the invention.

Further, as this storage medium, there can be used a semiconductor memory such as ROM and RAM, an optical disk, an optical magnetic disk, a magnetic storage medium, or the like. This can be constituted into a CD-ROM, an FD, a magnetic card, a magnetic tape, a non-volatile memory card, or the like for use.

Accordingly, this storage medium is used in other systems or apparatuses except the systems in the above-described embodiments, and the system or the computer reads and executes a program code stored in the storage medium, even by which the function equal to that of the above-described embodiments can be realized, and the effect equal thereto can be obtained to achieve the objects of the present invention.

Also in a case where OS or the like which is operated on the computer carries out a part of or the whole processing, or in a case where a program code read out of the storage medium is written into a memory provided on an expansion function board inserted into the computer or an expansion function unit connected to the computer, after which CPU or the like provided on the expansion function board or the expansion function unit carries out a part of or the whole processing, the function equal to that of the above-described embodiments can be realized, and the effect equal thereto can be obtained to achieve the objects of the present invention.

As described above, an image which is apparently not a copy-prohibited object can be applied with check whether or not it is a copy-prohibited object without taking much time; and an input image which is high in possibility of a copy-prohibited object image can be applied with more strict check, whereby the image recognizing processing function which is effective for anti-forgery can be realized efficiently by the software main body.

What is claimed is:

1. An image processing method comprising:
   a step of inputting image data; and
   plural steps of checking a copy-prohibited object for checking whether or not an image of the image data input from said inputting step is the copy-prohibited object,
   wherein each step except the final stage step out of said plural steps of checking the copy-prohibited object decides whether or not check is performed in the next stage of checking the copy-prohibited object on the basis of each check result, and
   wherein the order of said checks in said plural steps of checking the copy-prohibited object is determined on the basis of an operation amount required for each check processing.

2. A method according to claim 1, further comprising an image processing step of performing different image processing in accordance with the check result in said final stage of checking the copy-prohibited object.

3. A method according to claim 2, wherein in said image processing step, when the check result that said image is the copy-prohibited object is obtained by said final stage step of checking the copy-prohibited object, said image data is processed into unnormal image data and this data is then output, and when the check result that said image is not the copy-prohibited object is obtained, said image data is processed into normal image data and this data is then output.

4. A method according to claim 1, wherein the order of said check is such as to begin from the smallest operation amount.

5. A method according to claim 1, wherein said plural steps of checking the copy-prohibited object comprise steps in which pixel densities of images of said input image data which are objects to be checked are different, and said operation amount becomes an amount in accordance with said pixel density.

6. A method according to claim 5, wherein after completion of check in said plural steps of checking the copy-prohibited object, image data having a greater pixel density than that of the image used in the check processing is input, and said input image data is checked in the next stage of checking the copy prohibited object in accordance with said check result.

7. A method according to claim 1, further comprising a display step of displaying that check processing is being done in at least one step out of said plural steps of checking the copy-prohibited object.

8. An image processing apparatus comprising:
   input means for inputting image data; and
   plural means for checking a copy-prohibited object for checking whether or not an image of the image data input from said inputting means is a copy-prohibited object,
   wherein each means except the final stage means out of said plural means for checking the copy-prohibited object decides whether or not check is performed in the next stage means for checking the copy-prohibited object on the basis of each check result, and
   wherein the order of said checks in said plural means for checking the copy-prohibited object is determined on the basis of the operation amount required for each check processing.

9. An apparatus according to claim 8, further comprising image processing means for carrying out different image processing in accordance with the check result in said final stage means for checking the copy-prohibited object.

10. An apparatus according to claim 9, wherein in said image processing means, when the check result that said image is the copy-prohibited object is obtained by said final stage means for checking the copy-prohibited object, said image data is processed into unnormal image data and this data is then output, and when the check result that said image is not the copy-prohibited object is obtained, said image data is processed into normal image data and this data is then output.

11. An apparatus according to claim 8, wherein the order of said check is such as to begin from the smallest operation amount.

12. An apparatus according to claim 8, wherein said plural means for checking the copy-prohibited object comprise means in which pixel densities of images of said input image data which are objects to be checked are different, and said operation amount becomes an amount in accordance with said pixel density.

13. An apparatus according to claim 12, wherein after completion of check in said plural means for checking the copy-prohibited object, image data having a greater pixel density than that of the image used in the check processing is input, and said input image data is checked in the next stage means for checking the copy-prohibited object in accordance with said check result.

14. An apparatus according to claim 8, further comprising display means for displaying that check processing is being done in at least one means out of said plural means for checking the copy-prohibited object.

15. A storage medium which computer readably stores programs for executing:
   input processing for inputting image data; and
   plural processings for checking a copy-prohibited object for checking whether or not an image of the image data input by said input processing is the copy-prohibited object,
   wherein each processing except the final stage processing out of said plural processings of checking the copy-prohibited object decides whether or not check is carried out in the next stage process of checking the copy-prohibited object on the basis of each check result, and
   wherein the order of said checks in said plural processings of checking the copy-prohibited object is determined on the basis of an operation amount required for each check processing.

16. A medium according to claim 15, which stores a program for executing the image process for carrying out different process in accordance with the check result in said final stage process of checking the copy-prohibited object.

17. A medium according to claim 16, wherein in said image processing, when the check result that said image is the copy-prohibited object is obtained by said final stage processing of checking the copy-prohibited object, said image data is processed into unnormal image data and this data is then output, and when the check result that said image is not the copy-prohibited object is obtained, said image data is processed to normal image data and this data is then output.

18. A medium according to claim 15, wherein the order of said check is such as to begin from the smallest operation amount.

19. A medium according to claim 15, wherein said plural processings of checking the copy-prohibited object comprise process in which pixel densities of images of said image data input are different, and said operation amount becomes an amount in accordance with said pixel density.

20. A medium according to claim 19, wherein after completion of check in said plural processings of checking the copy-prohibited object, image data having a greater pixel density than that of the image used in the check processing is input, and said input image data is checked in the next stage process of checking the copy-prohibited object in accordance with said check result.

21. A medium according to claim 15, which stores a program for executing display process for displaying that check processing is being done in at least one processing out of said plural processings of checking the copy-prohibited object.

22. A method according to claim 1, wherein said checking step is executed through a software process by a program.

23. A method according to claim 1, wherein, in said inputting step, the image data is input from the Internet, a network, a digital camera, or a storage medium.

* * * * *

UNITED STATES PATENT AND TRADEMARK OFFICE
CERTIFICATE OF CORRECTION

PATENT NO. : 6,839,146 B1
DATED : January 4, 2005
INVENTOR(S) : Yoshihiro Ishida et al.

It is certified that error appears in the above-identified patent and that said Letters Patent is hereby corrected as shown below:

Column 1,
Line 40, "of the" should read -- of --.

Column 3,
Line 16, "Step S110," should read -- S10, --.

Column 5,
Line 13, "is" should be deleted.
Line 43, "$\leqq R \leqq 255, 0<G_L<G_H<255,$" should read -- $0\leqq R\leqq 255, 0\leqq G\leqq 255,$ and $0\leqq B\leqq 255,$ --.
Line 44, "0 $G_L<G_H<255,$ and $0<B_L B_H<255$" should read -- $0<G_L<G_H<255,$ and $0<B_L<B_H< 255$ --.

Column 6,
Lines 18, 22 and 24, "simply" should read -- simple --.
Line 66, "Step S1120" should read -- Step S120 --.

Column 7,
Line 1, "Step S1110," should read -- Step S110, --.

Column 10,
Line 66, "A medium" should read -- A storage medium --.

UNITED STATES PATENT AND TRADEMARK OFFICE
CERTIFICATE OF CORRECTION

PATENT NO. : 6,839,146 B1
DATED : January 4, 2005
INVENTOR(S) : Yoshihiro Ishida et al.

It is certified that error appears in the above-identified patent and that said Letters Patent is hereby corrected as shown below:

Column 11,
Lines 3, 12 and 15, "A medium" should read -- A storage medium --.

Column 12,
Lines 1 and 8, "A medium" should read -- A storage medium --.

Signed and Sealed this

Tenth Day of January, 2006

JON W. DUDAS
*Director of the United States Patent and Trademark Office*